(12) United States Patent
Huang

(10) Patent No.: US 12,423,840 B2
(45) Date of Patent: Sep. 23, 2025

(54) METHOD AND SYSTEM FOR BINOCULAR RANGING FOR CHILDREN

(71) Applicants: ZHEJIANG LINGCHUANG NETWORK TECHNOLOGY CO., LTD., Hangzhou (CN); DONGSHENG SHENZHOU TOURISM MANAGEMENT CO., LTD., Ningbo (CN)

(72) Inventor: Shuicai Huang, Hangzhou (CN)

(73) Assignees: DONGSHENG SHENZHOU TOURISM MANAGEMENT CO., LTD., Ningbo (CN); ZHEJIANG LINGCHUANG NETWORK TECHNOLOGY CO., LTD., Hangzhou (CN)

( * ) Notice: Subject to any disclaimer, the term of this patent is extended or adjusted under 35 U.S.C. 154(b) by 384 days.

(21) Appl. No.: 18/296,101

(22) Filed: Apr. 5, 2023

(65) Prior Publication Data
US 2023/0237682 A1 Jul. 27, 2023

Related U.S. Application Data

(63) Continuation of application No. PCT/CN2022/113464, filed on Aug. 19, 2022.

(30) Foreign Application Priority Data

Sep. 17, 2021 (CN) .......................... 202111092737.7

(51) Int. Cl.
G06T 7/50 (2017.01)
G06V 10/774 (2022.01)
(Continued)

(52) U.S. Cl.
CPC .............. *G06T 7/50* (2017.01); *G06V 10/774* (2022.01); *G06V 40/172* (2022.01); *G06V 40/18* (2022.01);
(Continued)

(58) Field of Classification Search
CPC ............. G06T 7/50; G06T 2207/20081; G06T 2207/30201; G06T 2207/10012;
(Continued)

(56) References Cited

U.S. PATENT DOCUMENTS

| 8,451,326 | B2 * | 5/2013 | Inaba | H04N 13/194 348/58 |
| 8,970,681 | B2 * | 3/2015 | Son | G06F 3/012 348/57 |
| 11,754,856 | B2 * | 9/2023 | Yoshida | A61B 3/032 351/237 |
| 2016/0142673 | A1 * | 5/2016 | Rao | G06V 40/193 348/14.08 |

(Continued)

FOREIGN PATENT DOCUMENTS

| CN | 107369305 A | 11/2017 |
| CN | 110780739 A | 2/2020 |

(Continued)

*Primary Examiner* — Wesley J Tucker
(74) *Attorney, Agent, or Firm* — Muncy, Geissler, Olds & Lowe, P.C.

(57) ABSTRACT

A method for binocular ranging for children is provided in this disclosure, which includes following steps: acquiring an image of a target area and world coordinates of a human body in left and right eyes; correcting the image to obtain a corrected image of the target area; performing face detection on the corrected image of the target area to obtain a face image and an eye image; recognizing the face image and determining whether the face image is a child's face; if yes, performing image correction based on the obtained face image; inputting the eye image into a preset eye recognition model for recognition whether the human eye is staring at a screen; and performing ranging on the eye image based on the world coordinates of the human body to obtain a distance (Continued)

between the screen and the human eye, if the human eye is staring at the screen.

8 Claims, 2 Drawing Sheets

(51) Int. Cl.
  *G06V 40/16* (2022.01)
  *G06V 40/18* (2022.01)
(52) U.S. Cl.
  CPC ............... *G06T 2207/20081* (2013.01); *G06T 2207/30201* (2013.01)
(58) Field of Classification Search
  CPC . G06T 2207/30041; G06T 7/593; G06T 7/73; G06T 7/11; G06T 2207/20021; G06T 5/80; G06V 10/774; G06V 40/172; G06V 40/18; G06V 40/161
  See application file for complete search history.

(56) References Cited

U.S. PATENT DOCUMENTS

| | | | |
|---|---|---|---|
| 2018/0095528 A1* | 4/2018 | Tao | G06F 3/012 |
| 2019/0147241 A1* | 5/2019 | Shudo | H04N 23/73 |
| | | | 348/78 |
| 2019/0208181 A1* | 7/2019 | Rowell | H04N 9/8205 |
| 2022/0092880 A1* | 3/2022 | Takei | G06V 40/161 |
| 2022/0207662 A1* | 6/2022 | Gupta | G06T 7/13 |
| 2023/0237694 A1* | 7/2023 | Huang | G06T 7/73 |
| | | | 382/103 |
| 2023/0237699 A1* | 7/2023 | Huang | G06V 40/178 |
| | | | 382/118 |
| 2024/0221423 A1* | 7/2024 | Wang | G06V 20/46 |
| 2024/0379206 A1* | 11/2024 | Thompson | G16H 20/00 |

FOREIGN PATENT DOCUMENTS

| | | |
|---|---|---|
| CN | 113808207 A | 12/2021 |
| WO | WO2017152649 A1 | 9/2017 |

* cited by examiner

METHOD AND SYSTEM FOR BINOCULAR RANGING FOR CHILDREN

CROSS REFERENCE TO RELATED APPLICATIONS

This application is a Continuation of co-pending Application No. PCT/CN2022/113464, filed on Aug. 19, 2022, for which priority is claimed under 35 U.S.C. § 120; and this application claims priority of application No. 202111092737.7 filed in China on Sep. 17, 2021 under 35 U.S.C. § 119, the entire contents of all of which are hereby incorporated by reference.

TECHNICAL FIELD

The disclosure relates to the field of image processing, in particular to a method and a system for binocular ranging for children.

BACKGROUND ART

Currently, myopia among teenagers of all ages in China shows a trend with early onset, rapid progression and deep degree. According to incomplete statistics, incidence of myopia in primary-school students, junior-high-school students and senior-high-school students in China is about 30%, 60% and 80% respectively, while incidence of myopia among college students has reached 90%. With decreased outdoor activities, dependence on electronic products and heavy schoolwork burden, incidence of myopia is rising with changes of people's lifestyle. According to statistics of the World Health Organization, there are about 1.4 billion nearsighted people in the world, nearly half of which are in China.

Reasons for this situation can be attributed to increased frequency or duration of electronic products being used. Therefore, in related art, more and more technologies or methods have been adopted to study how to remind users when the electronic products are used for too long.

A general solution is to measure a distance between a human body and an electronic product by a ranging method so as to remind that using time of the electronic product is too long or eyes are too close to a screen of the electronic product, but this method has following defects.

It is rarely used to performing measurement for children, and even if there is ranging for children, its result is inaccurate because of complicated parameter setting.

Some set parameters may not be adjusted in time with changes of children's height and weight, which leads to failure of ranging.

When a camera is placed incorrectly, for example, is inclined, a measurement result may be incorrect.

SUMMARY

In view of shortcomings in the related art, a method and a system for binocular ranging for children are provided in this disclosure.

In order to solve the above technical problems, the disclosure is solved by a following technical scheme: a method for binocular ranging for children, which includes following steps.

acquiring an image of a target area and world coordinates of a human body in left and right eyes;
correcting the image of the target area so as to obtain a corrected image of the target area;
performing face detection on the corrected image of the target area so as to obtain a face image and an eye image;
recognizing the face image based on a preset face recognition model and determining whether the face image is a child's face or not;
inputting the eye image into a preset eye recognition model for recognition and determining whether the human eye is staring at a screen or not; and
performing ranging on the eye image based on the world coordinates of the human body so as to obtain a distance between the screen and the human eye, if the human eye is staring at the screen.

Further, the method further includes determining whether the distance between the screen and the human eye is greater than a set value, and if the distance between the screen and the human eye is greater than the set value, triggering a reminder to remind children that their sight is too close to a screen terminal so as to function in supervising children's healthy eye usage.

Further, correcting the image includes parameter collection, distortion removing and stereo rectification, so as to obtain corrected image information, which is used for correcting an initial image and providing clear and accurate image information for subsequent steps.

Further, performing the face detection so as to process the image information with the face recognition model includes image detecting, person positioning and image segmenting so as to obtain a segmented face image and eye image.

Further, the face recognition model is established by following steps:
acquiring a training sample, the training sample including a sample face image and labeled face discrimination information;
the sample face image being face images for 4 to 16 year old; and
taking the face image of the face training sample as input and the labeled face discrimination information as output to perform training so as to obtain the face recognition model, thus functioning in quickly and accurately recognizing children using age calculation without setting up children's information in advance.

Further, the eye recognition model is established through following steps:
acquiring a training sample, the training sample including a sample eye image and labeled eye discrimination information;
the sample eye image being an image in which a gaze direction of a human eye is within 15 degree in four directions of up, down, left and right directions; and
taking the sample eye image as input and the labeled eye discrimination information as output to perform training so as to obtain the eye recognition model, for quickly and accurately determining whether child's sight is staring at a screen or not.

A system for binocular ranging for children includes an image acquisition module, a stereo rectification module, a face detection module, a face matching module, an eye gaze direction detection module and a ranging module.

the image acquisition module is configured for acquiring an image of a target area and world coordinates of a human body in left and right eyes;
the stereo rectification module is configured for correcting the image of the target area so as to obtain a corrected image of the target area;

the face detection module is configured for performing face detection on the corrected image of the target area so as to obtain a face image and an eye image;

The face matching module is configured for performing face recognition based on the face image and a trained child specific model.

the eye gaze direction detection module is configured for detecting whether a gaze direction of human eyes is in a direction toward a screen; and the ranging module is configured for ranging between the screen and the human eyes.

Further, the image acquisition module is a binocular camera, which includes two camera sensors arranged at intervals. The binocular camera can sense a depth, and the ranging can be realized only with left-right visual disparity, which, on one hand, improves accuracy of the ranging and on the other hand reduces detection time.

With the above technical scheme, the disclosure presents obvious technical effects as follows With the method and the system for binocular ranging for children according to this disclosure, the children can be automatically identified, the distance of children staring at the screen can be detected in real time, realizing intelligent supervision and thus guiding the children to use screen terminal equipment healthily. Compared with existing technical schemes, in the disclosure, there is no need to preset the height and weight of the children, with low requirements for camera placement, high binocular ranging data processing accuracy and a long ranging distance, and with advantages of being applied in multiple scenes.

BRIEF DESCRIPTION OF THE DRAWINGS

In order to explain the embodiments of the present disclosure or the technical scheme in the prior art more clearly, the drawings required in the description of the embodiments or the prior art will be briefly introduced below; obviously, the drawings in the following description are only some embodiments of the present disclosure, and other drawings can be obtained according to these drawings by those of ordinary skill in the art without paying creative labor.

DETAILED DESCRIPTION

The present disclosure will be further described in detail with reference to the following examples which present explanation the present disclosure and the present disclosure is not limited to the following examples.

Figure 1:
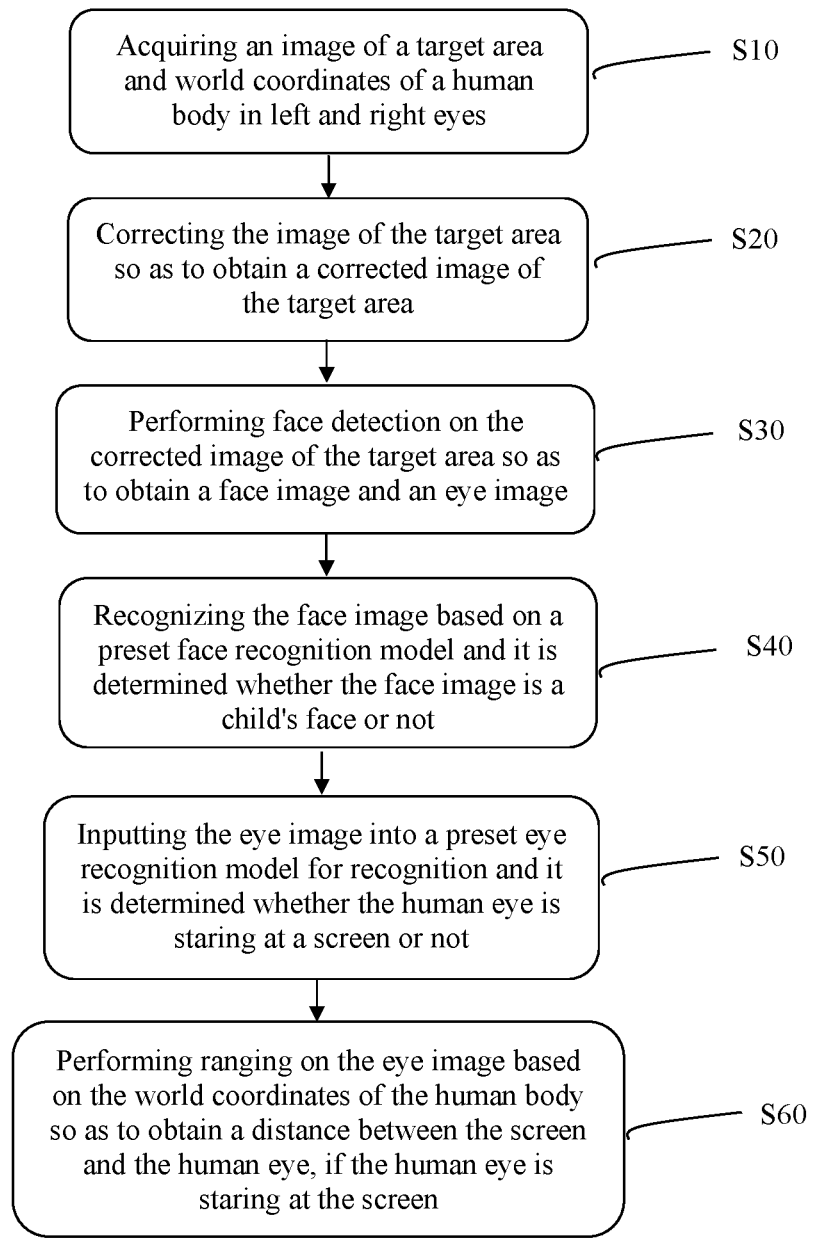
FIG. 1 is a flowchart of a method for binocular ranging for children according to an embodiment of the present disclosure.

Referring to FIG. 1, a method for binocular ranging for children is provided in an embodiment of the present disclosure, which includes following steps S10 to S60.

In step S10, an image of a target area and world coordinates of a human body in left and right eyes are acquired.

In this embodiment, image collection is made by acquiring an image within a certain range from a screen terminal with a binocular camera, so as to acquire target image information. The camera can be integrated into the screen terminal or placed outside of the screen. The camera is connected with a processing unit, and is configured to send the collected target image to the processing unit for subsequent series of processing. Specifically, the camera can be connected with the processing unit in a wired or wireless way for corresponding data transmission. The processing unit can be a processor integrated in the screen terminal or a processor in a central control device of Internet of Things.

In step S20, the image of the target area is corrected so as to obtain a corrected image of the target area.

In stereo vision, a position of an object is different in images obtained by two cameras of the binocular camera. In order to reduce calculation amount for matching, imaging planes of the two cameras should be in a same plane. However, it is obviously difficult to achieve this goal only by strictly placing the cameras, and stereo rectification needs to be made by eliminating distortion. After the two cameras are vertically aligned, the observed objects will be at a same vertical coordinate (in a same column in the image). Only X coordinate is needed to be focused to calculate the depth, because there will be a large difference in the X axis between near objects; and in order to achieve this goal, it is needed to correct the image of the target area.

In the embodiment of the disclosure, correcting the image includes parameter collecting, distortion eliminating and stereo rectification. Parameter collecting is to perform big-data calculation on target data from different perspectives and to collect parameters in combination with parameters of the camera. Distortion eliminating and stereo rectification are to perform distortion eliminating and stereo rectification on the world coordinates and target key points of the image through a stereo rectification function in OpenCV. OpenCV is an open source cross-platform computer vision library, which can be executed on Linux, Windows, Android and other operating systems, and can be used for image processing and development of computer vision applications. In addition, in a process of extracting the world coordinates and the target key points of the image, vertical coordinate difference can be used as a correction basis and normalized processing parameters can be directly substituted into a processing algorithm, which can save time waiting for conversion of the stereo rectification function in OpenCV and improve a processing speed of the algorithm.

In step S30, face detection is performed on the corrected image of the target area so as to obtain a face image and an eye image.

A purpose of the face detection is to get any frame of the target image. The target image is searched with face detection algorithm to determine whether there is a face in the target image, because the target image may contain objects that are not faces, such as indoor furniture and other parts of a person (such as legs, shoulders and arms).

The face detection algorithm built in the processing unit can be configured to perform face detection on any frame of the target image. If there is a face in this frame, subsequent steps such as face feature extraction can be carried out. The face detection algorithm can be realized by a classifier with OpenCV. In this embodiment, a yolo-based face detection algorithm is adopted for face detection. The target image is cut into 49 image blocks, and then each of the image blocks is measured to determine a face position. In addition, the yolo-based face detection algorithm is configured to cut the target image into 49 image blocks, key parts such as eyes can be refined in a subsequent feature extraction stage, thus improving accuracy of face feature extraction and face matching.

In other embodiments, a histogram of oriented gradient is adopted to detect the face position. Firstly, the target image is grayed, and then gradient of pixels in the image is calculated. The face position can be detected and obtained by converting the image into the histogram of oriented gradient.

In step S40, the face image is recognized based on a preset face recognition model and it is determined whether the face image is a child's face or not.

In the embodiment of the disclosure, the face recognition model is established by following steps:

acquiring a training sample, the training sample including a sample face image and labeled face discrimination information;

the sample face image being face images for 4 to 16 year old; and taking the face image of the face training sample as input and the labeled face discrimination information as output to perform training so as to obtain the face recognition model.

In other embodiments, the face recognition model is obtained by training with sample face images which are face image and labeled face discrimination information for 4 to 12 years old.

In this embodiment, the face data set for 4 to 16 years old is adopted to avoid a situation that some children are excluded by the face recognition system because their faces are mature and their actual age is less than their appearance age.

In a case where children need to be classified according to a smaller age interval, more refined and differentiated control is required to be carried out, all of the face feature values in the face data set are trained to be divided into several face data sets with different intervals, and then children of different ages are measured differently. Specifically, by using a face recognition method and by calculating an Euclidean distance between the target face and a weight vector of a respective person in the face database, children of different ages can be identified more accurately.

In step S50, the eye image is inputted into a preset eye recognition model for recognition and it is determined whether the human eye is staring at a screen or not.

In the embodiment of the disclosure, the eye recognition model is established by following steps:

acquiring a training sample, the training sample including a sample eye image and labeled eye discrimination information;

the sample eye image being an image in which a gaze direction of a human eye is within 15 degree in four directions of up, down, left and right directions; and taking the sample eye image as input and the labeled eye discrimination information as output to perform training so as to obtain the eye recognition model.

The eye image is input into the eye recognition model to determine whether the child is staring at the screen.

In step S60, ranging is performed on the eye image based on the world coordinates of the human body so as to obtain a distance between the screen and the human eye, if the human eye is staring at the screen, specifically with following formula:

$$\text{Distance} = \frac{\text{Distance between left and right eyes} * \text{Focal length}}{\text{Left} - \text{right visual disparity} * \text{Parameters of camera}};$$

where the left-right visual disparity refers to difference in the X coordinate between same feature points on the left and right images.

It is determined whether the distance between the screen and the human eye is greater than a set value, and if yes, a reminder is triggered.

With the method for binocular ranging for children according to this disclosure, the children can be automatically identified, the distance of children staring at the screen can be detected in real time, realizing intelligent supervision and thus guiding the children to use screen terminal equipment healthily. Compared with existing technical schemes, in the disclosure, there is no need to preset the height and weight of the children, with low requirements for camera placement, high binocular ranging data processing accuracy and a long ranging distance, and with advantages of being applied in multiple scenes.

Figure 2:
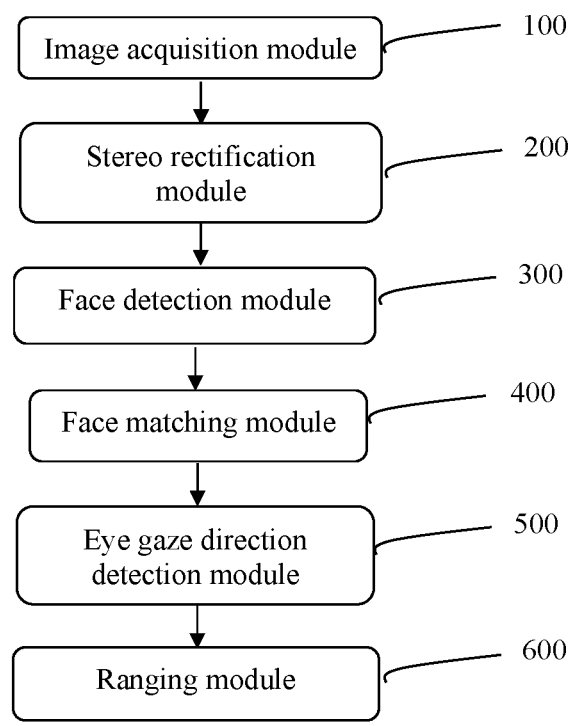
FIG. 2 is a block diagram of a system for binocular ranging for children according to an embodiment of the present disclosure.

In addition, based on the method for binocular ranging for children, a system for binocular ranging for children is further provided in an embodiment of the disclosure, as shown in FIG. 2, which includes an image acquisition module 100, a stereo rectification module 200, a face detection module 300, a face matching module 400, an eye gaze direction detection module 500 and a ranging module 600.

The image acquisition module 100 is configured for acquiring an image of a target area and world coordinates of a human body in left and right eyes.

The stereo rectification module 200 is configured for correcting the image of the target area so as to obtain a corrected image of the target area.

The face detection module 300 is configured for performing face detection on the corrected image of the target area so as to obtain a face image and an eye image.

The face matching module 400 is configured to recognize the face image based on a preset face recognition model and determine whether the face image is a child's face or not.

The eye gaze direction detection module 500 is configured for detecting whether a gaze direction of human eyes is in a direction toward a screen.

The ranging module 600 is configured for ranging between the screen and the human eyes.

In the embodiment of the disclosure, the image acquisition module 100 adopts a binocular camera, which includes two camera sensors arranged at intervals. The binocular camera can sense a depth, and the ranging can be realized only with left-right visual disparity, which, on one hand, improves accuracy of the ranging and on the other hand reduces detection time.

To sum up, a system for binocular ranging for children is provided in the embodiment of the present disclosure, which can be implemented as a program and executed on computer device. Various program modules that make up the system for binocular ranging for children can be stored in a memory of the computer device, such as the image acquisition module 100, the stereo rectification module 200, the face detection module 300, the face matching module 400, the eye gaze direction detection module 500 and the ranging module 600 shown in FIG. 2. The program composed of respective program modules causes the processor to execute steps in a method for binocular ranging for children in various embodiments of the present disclosure described in this specification.

In addition, it should be noted that the specific embodiments described in this specification may have different shapes, names or the like of parts and components. Equivalent or simple changes made in accordance with the configurations, features and principles described in the inventive concept are included in the scope of protection of the inventive disclosure. Various modifications, supplements or similar replacements can be made to the described specific embodiments by those skilled in the art to which the present disclosure pertains, which fall within the protection scope of the present disclosure without departing from the structure of the present disclosure or beyond the scope defined by the claims.

The invention claimed is:

1. A method for binocular ranging for children, comprising following steps:
   acquiring, by a binocular camera, an image of a target area and world coordinates of a human body in left and right eyes;
   correcting, by a processor connected with the binocular camera, the image of the target area so as to obtain a corrected image of the target area;
   performing, by the processor, face detection on the corrected image of the target area so as to obtain a face image and an eye image;
   recognizing, by the processor, the face image based on a preset face recognition model and determining whether the face image is a child's face or not;
   inputting, by the processor, the eye image into a preset eye recognition model for recognition and determining whether the human eye is staring at a screen or not; and
   performing, by the processor, ranging on the eye image based on the world coordinates of the human body so as to obtain a distance between the screen and the human eye, if the human eye is staring at the screen.

2. The method for binocular ranging for the children according to claim 1, further comprising determining whether the distance between the screen and the human eye is greater than a set value, and if yes, triggering a reminder.

3. The method for binocular ranging for the children according to claim 1, wherein the correcting, by the processor, the image comprises parameter collection, distortion removing and stereo rectification, so as to obtain corrected image information.

4. The method for binocular ranging for the children according to claim 1, wherein performing the face detection so as to process the image information with the face recognition model comprises image detecting, person positioning and image segmenting so as to obtain a segmented face image and eye image.

5. The method for binocular ranging for the children according to claim 1, wherein the face recognition model is established by following steps:
   acquiring, by the processor, a training sample, the training sample comprises a sample face image and labeled face discrimination information;
   the sample face image being face images for 4 to 16 year old; and
   taking, by the processor, the face image of the face training sample as input and the labeled face discrimination information as output to perform training so as to obtain the face recognition model.

6. The method for binocular ranging for the children according to claim 1, wherein the eye recognition model is established by following steps:
   acquiring, by the processor, a training sample, the training sample comprising a sample eye image and labeled eye discrimination information;
   the sample eye image being an image in which a gaze direction of a human eye is within 15 degree in four directions of up, down, left and right directions; and
   taking, by the processor, the sample eye image as input and the labeled eye discrimination information as output to perform training so as to obtain the eye recognition model.

7. A system for binocular ranging for children, comprising: a computer device, wherein an image acquisition module, a stereo rectification module, a face detection module, a face matching module, an eye gaze direction detection module and a ranging module can be stored in a memory of the computer device and executed on the computer device;
   the image acquisition module is configured for acquiring an image of a target area and world coordinates of a human body in left and right eyes;
   the stereo rectification module is configured for correcting the image of the target area so as to obtain a corrected image of the target area;
   the face detection module is configured for performing face detection on the corrected image of the target area so as to obtain a face image and an eye image;
   the face matching module is configured to recognize the face image based on a preset face recognition model and determine whether the face image is a child's face or not;
   the eye gaze direction detection module is configured for detecting whether a gaze direction of human eyes is in a direction toward a screen; and
   the ranging module is configured for ranging between the screen and the human eyes.

8. The system for binocular ranging for children according to claim 7, wherein the image acquisition module is a binocular camera, which comprises two camera sensors arranged at intervals.

* * * * *